July 8, 1969     J. GILMOUR, JR     3,454,305
AXLE MOUNT
Filed Feb. 27, 1967
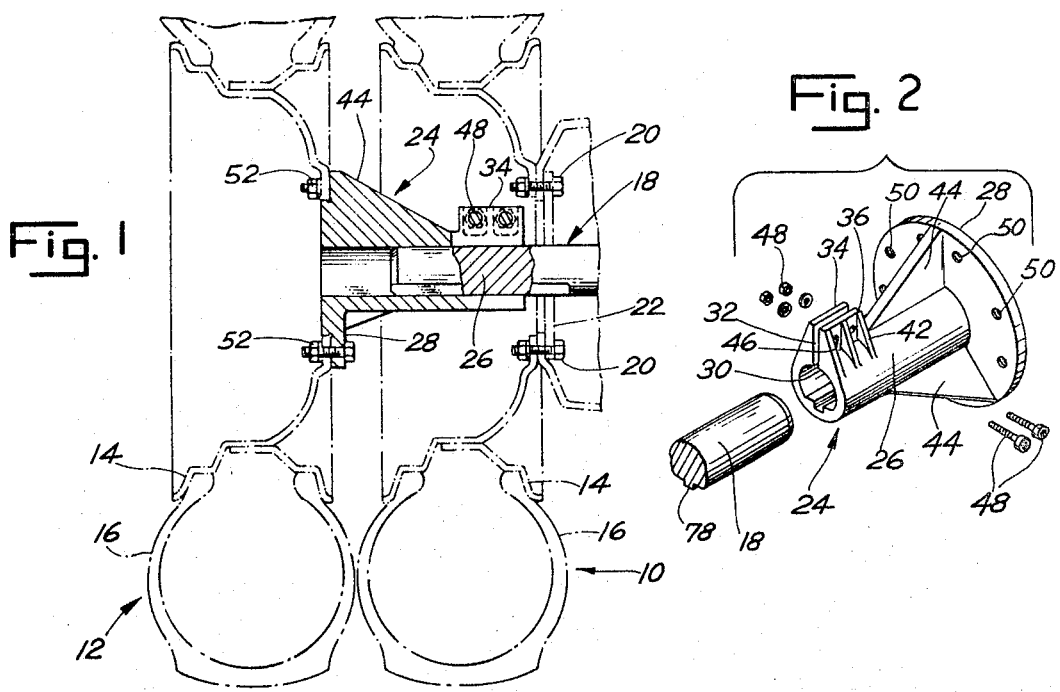
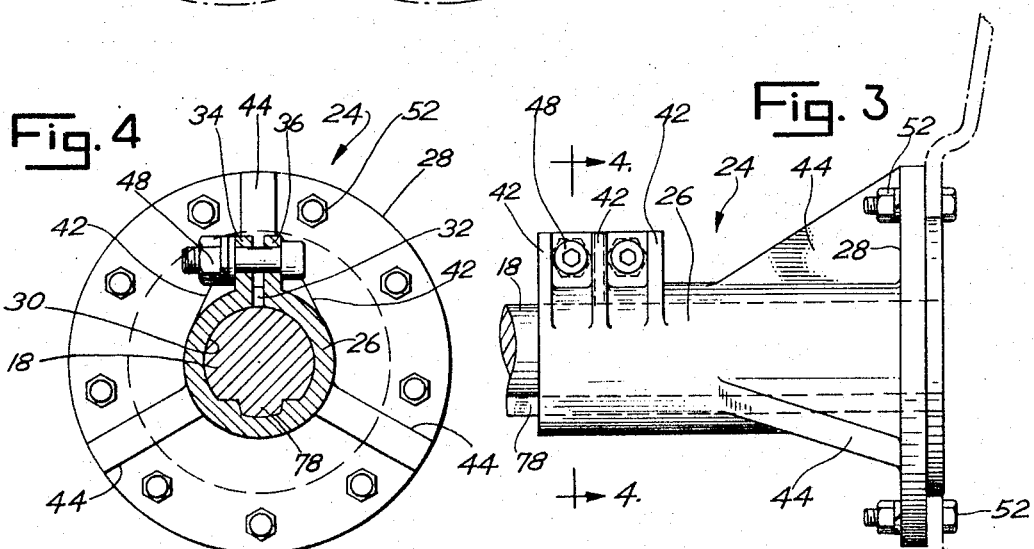
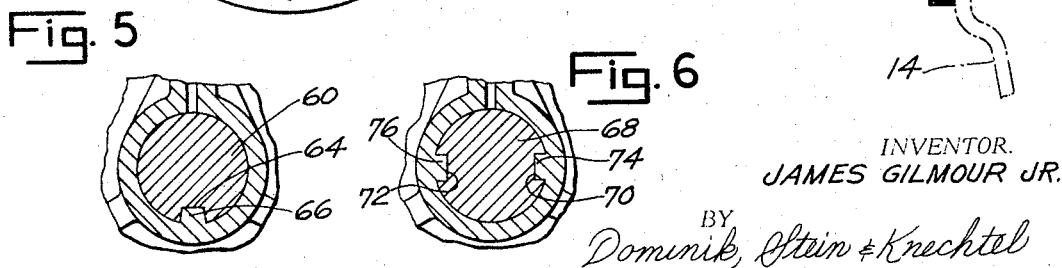
INVENTOR.
JAMES GILMOUR JR.
BY Dominik, Stein & Knechtel
ATTORNEYS

United States Patent Office 3,454,305
Patented July 8, 1969

3,454,305
AXLE MOUNT
James Gilmour, Jr., 525 Ash Lawn,
Oswego, Ill. 60543
Filed Feb. 27, 1967, Ser. No. 618,712
Int. Cl. B60b 37/00, 11/00, 15/00
U.S. Cl. 301—1      4 Claims

ABSTRACT OF THE DISCLOSURE

A dual axle mount which includes a split hub which is adapted to be affixed to the rim of a wheel and which has an axle bore in it for receiving and securing it to an axle. The hub is affixed to an axle, by means of bolts which are extended, in a straight through alignment, through a pair of arms which are adapted to be drawn together to tightly clamp the hub about the axle.

---

This invention relates, in general, to tractors and, in particular, to axle mounts for tractors for converting the drive wheels thereof, from singles to duals.

Numerous arrangements have been devised for converting a tractor's drive wheels from singles to duals, however, each of them has been generally unsatisfactory, for one reason or another. For example, many of these arrangements are so-called rim mount duals, the rims of the dual wheels being fixedly and drivingly secured to rims of the generally used wheels. Rim mount duals often place a considerable strain on the rims of both of the wheels, and particularly on the rims of the wheel to which the dual is affixed. This strain many times results in a destruction of one or both of the rims, due to warpage, breakage and the like. Many of the other arrangements have included a hub of some type which is adapted to be affixed, in most cases, with U-bolts, to the tractor's axle. These hubs are generally quite unstable and, as a result, they are subject to considerable wear and rendered useless after a relatively short period of use.

Accordingly, it is an object of the present invention to provide improved dual axle mounts which are particularly useful in converting the drive wheels of tractors, from single wheels to dual wheels.

Another object is to provide improved dual axle mounts of the described type which are adaptable to any size and shape axle.

Still another object is to provide improved dual axle mounts of the described type which minimize the manual labor required to install and remove the dual axle mount and/or the dual wheel.

Another object is to provide improved dual axle mounts of the latter described type having straight through alignment bolts which function to affix the dual axle mount to an axle so as to provide a more sturdy construction than that of a U-bolt design.

Still another object is to provide improved dual axle mounts of the described type which reduces the strain on the wheels of, for example, a tractor.

A still further object is to provide improved dual axle mounts of the described type which can be left affixed to an axle when the dual wheel is removed.

Other objects of the invention will in part be obvious and will in part appear hereinafter.

The above objectives are accomplished with a dual axle mount which includes, generally, a split hub which is adapted to be affixed to the rim of a wheel and which has an axle bore in it for receiving and securing it to any size or shape axle. The hub is affixed to an axle, by means of bolts which are extended, in a straight through alignment, through a pair of arms which are adapted to be drawn together to tightly clamp the hub about the axle. With this construction, a versatile sturdy dual axle mount is provided.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a partial view of a set of dual wheels, sectionalized to illustrate the manner in which the dual axle mount of the present invention is affixed to an axle to convert a single wheel to a dual wheel;

FIG. 2 is a perspective view of the dual axle mount;

FIG. 3 is a side plan view of the dual axle mount, illustrating the manner in which it is affixed to an axle and further illustrating the manner in which the rim of a wheel is affixed to it;

FIG. 4 is a sectional view taken along lines 4—4 of FIG. 3; and

FIGS. 5 and 6 are partial sectional views, illustrating the various shape axle bores formed in the dual axle mount.

Similar reference characters refer to similar parts throughout the several views of the drawing.

Referring now to the drawing, in FIG. 1 there is illustrated a pair of wheels 10 and 12 each including a rim 14 having a tire 16 mounted on it. The wheel 10 is drivingly affixed to an axle 18, by means of lug bolts 20 extended through apertures (not shown) in the rim 14 and a hub 22. The axle 18 and the hub 22 (both of which are partially shown) may be the axle and hub of a tractor (not shown). The wheel 12 is drivingly affixed to the axle 18, by means of the dual axle mount 24 of the present invention, which is described in detail below. A pair of the dual axle mounts 24 permits the single drive wheels normally provided on a tractor to be easily and quickly converted to duals.

More specifically, the dual axle mount 24, as can be best seen in FIGS. 2–4, includes a substantially circular-shaped hub 26 having an enlarged circular-shaped end plate 28 affixed to its one end and an axle receiving bore 30 extending through it. The bore 30 is adapted to receive and fixedly retain an axle therein, as described more fully below. The hub 26 and the end plate 28 are advantageously and preferably cast as an integral unit, however, they could be formed as separate units and fixedly secured together, by welding.

The hub 26 has a slot 32 (FIG. 4) formed in its side wall at its one end and a pair of arms 34 and 36 are vertically disposed, in parallel relationship, along the opposite sides of the slot 32. Triangular-shaped support ribs 42 are integrally formed with the arms 34, 36 and the side wall of the hub, to provide additional strength. Apertures 46 are extended through the arms 34 and 36 for receiving fastening means, such as the threaded nuts and bolts 48, to forcibly urge the arms 34, 36 together to tightly clamp an axle within the bore 30.

The bore 30 extends through the end plate 28 and the end plate has a number of radially disposed apertures 50 in it about its peripheral edge which are positioned to align with the apertures normally provided in a wheel rim, such as the rim 14. Lug bolts 52 (FIGS. 1, 3 and 4) are extended through the apertures 50 to removably affix a rim to the end plate 28, as illustrated in FIGS. 1 and 3. A number of support ribs 44, which can be triangular-shaped, as illustrated, also are formed with the side wall of the hub 26 and the end plate 28, to provide additional strength.

The bore 30 is correspondingly formed to receive an axle of a predetermined configuration and, as can be best seen in FIGS. 4, 5 and 6, can be any one of a number of different configurations. In each case, the interior surface of its side wall is correspondingly shaped to fixedly and lockingly receive the axle. For example, in the embodiment illustrated in FIGS. 1–4, the axle 18 is substantially circular in shape, having an end portion which is formed to provide a substantially rectangular shaped key 78. The bore 30 also is substantially semicircular in shape, having a radius which substantially corresponds to the radius of the axle 18 so that the axle 18 fits snugly therein, and is further correspondingly formed to matingly receive the key portion 78 of the axle 18. In the embodiment illustrated in FIG. 5, the axle 60 is substantially circular in shape, having an end portion which has a recessed cavity formed in it to provide a substantially rectangular-shaped key slot 64. The bore 30, in this case, is correspondingly shaped and provided with an upstanding lug 66 which mates with the key slot 64. In the embodiment illustrated in FIG. 6, the axle 68 has two diametrically opposed recessed cavities formed in it to provide two key slots 70 and 72. The bore 30 is likewise provided with a pair of projecting lugs 74 and 76 which lockingly mate with the key slot 70 and 72. Accordingly, when the arms 34 and 36 are fixedly clamped about the axle 18, the latter is fixedly and rigidly retained therein. It has been found that this construction, and particularly the straight through alignment of the nuts and bolts 48, provides a rigid assembly which is much more sturdy and less subject to damage than the dual axle mounts presently available.

In converting a single wheel into a dual wheel, a hub 26 having an appropriately shaped bore 30 in it is affixed to the axle by sliding the axle through the bore 30. After the hub 26 is properly positioned on the axle 18, the nuts and bolts 48 are tightened to draw or squeeze the arms 34 and 36 together to fixedly clamp the hub about the axle. Thereafter, the dual wheel, such as the wheel 12, is affixed to the hub 26 or, more particularly, to the end plate 28, thereof, by extending lug bolts 52 through the apertures formed within the end plate 28 and the rim 14 in the same fashion in which a wheel is normally affixed to a hub. It may be noted that the rim 14 of the dual wheel is affixed to a "hub," as opposed to the rim of the other wheel, so that there is no additional strain placed on the rim of either of the two wheels. As indicated above, the straight through alignment of the nuts and bolts 48 provide a far more sturdy construction, particularly when compared to the dual axle mounts of the type which employ U bolts. Accordingly, the hubs are far more stable and are less subject to wear and/or damage than those employing U bolts, rim mounts or similar constructions.

From the above description, it can be seen that the dual axle mount 24 and the dual wheel both can be easily and quickly affixed to a tractor's axle, to convert the drive wheels thereof to duals. Furthermore, the dual wheel can be quickly removed, in the same fashion as a wheel is generally removed, and the dual axle mount 24 can be left affixed to the axle, if desired. The dual axle mount also can be easily and quickly adapted to fit virtually any size and shape axle, merely by providing the appropriate bore 30 in it.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Now that the invention has been described, what is claimed as new and desired to be secured by Letters Patent is:

1. A dual wheel mounting assembly including an inner wheel mounted on an axle and an outer wheel affixed on a dual axle mount, said axle mount comprising an integral cast hub unit having an enlarged circular shaped plate affixed to its one end, a central axle receiving bore extending through said hub and said plate, a plurality of apertures in predetermined spaced relation radially adjacent the periphery of said plate for receiving lug bolts for affixing said plate to the rim of said outer wheel, a slot formed in said hub extending transversely along at least a portion of its length from its axially inner end, at least one arm extending vertically from said hub along each of the opposite sides of said slot, a plurality of apertures in said arms for receiving fastening means for forcibly urging said arms together toward one another to fixedly clamp and to lock said dual axle mount to said axle, and a plurality of support ribs integral with said plate and said hub for providing additional support to said plate.

2. The dual axle mount of claim 1 wherein said apertures in said arms have a straight through alignment and wherein said fastening means comprise a plurality of threaded nuts and bolts which are adapted to extend through respective ones of the aligned apertures.

3. The dual axle mount of claim 2 wherein said central axle receiving bore has a size and a configuration corresponding to that of the cross section of the axle to which it is affixed.

4. The dual axle mount of claim 2 further including a plurality of support ribs affixed to said arms and to said hub for providing additional support to said arms.

References Cited

UNITED STATES PATENTS

| 2,789,014 | 4/1957 | Swicegood | 301—1 |
| 2,804,157 | 8/1957 | Preston. | |
| 2,973,209 | 2/1961 | Shaw. | |
| 3,000,673 | 9/1961 | Lansing | 301—128 |

RICHARD J. JOHNSON, *Primary Examiner.*

U.S. Cl. X.R.

287—53, 36, 38